(12) United States Patent
Harita (10) Patent No.: US 7,684,184 B2
(45) Date of Patent: Mar. 23, 2010

(54) DISPLAY APPARATUS

(75) Inventor: Keisuke Harita, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/333,971

(22) Filed: Dec. 12, 2008

(65) Prior Publication Data

US 2009/0256031 A1 Oct. 15, 2009

(30) Foreign Application Priority Data

Apr. 15, 2008 (JP) .............................. 2008-106060

(51) Int. Cl.
*G06F 1/16* (2006.01)

(52) U.S. Cl. .................... 361/679.36; 312/7.2; 381/160; 345/156; 710/304

(58) Field of Classification Search ................ 312/7.2, 312/195, 723.2, 223.2; 381/160, 306; 359/697; 361/679.36, 679.27, 679.41, 679.01, 679.02; 710/304; 248/633, 636, 686; 382/118; 345/156, 345/173

See application file for complete search history.

(56) References Cited

U.S. PATENT DOCUMENTS

| 6,714,405 | B2 | 3/2004 | Jitsukawa |
| 2003/0016493 | A1 | 1/2003 | Hiratomo et al. |
| 2006/0291149 | A1 * | 12/2006 | Suzuki et al. ............... 361/679 |
| 2007/0279765 | A1 * | 12/2007 | Takahashi .................... 359/697 |
| 2008/0165991 | A1 * | 7/2008 | Shyu et al. .................. 381/160 |
| 2009/0140615 | A1 * | 6/2009 | Freeman ..................... 312/7.2 |

FOREIGN PATENT DOCUMENTS

| JP | 6-32788 | 4/1994 |
| JP | 07-106775 | 4/1995 |
| JP | 09-016287 | 1/1997 |
| JP | 2000-133959 | 5/2000 |
| JP | 2002-334571 | 11/2002 |
| JP | 2006-161985 | 6/2006 |

* cited by examiner

*Primary Examiner*—Hung V Duong
(74) *Attorney, Agent, or Firm*—Blakely, Sokoloff, Taylor & Zafman LLP (57) ABSTRACT

According to one embodiment, a display apparatus is provided with a support base including an upright wall and a support wall projecting horizontally from the upright wall, a holder holding a read/write device, a mounting member including a first portion opposed to the holder from above and a second portion horizontally opposed to the upright wall, a first elastic member interposed between the support wall and the holder, a second elastic member interposed between the first portion of the mounting member and the holder, and a fastening member fixing the second portion of the mounting member to the upright wall in a direction perpendicular to a back surface of a display panel. The first elastic member is pressed toward the support wall by a weight of the read/write device.

7 Claims, 8 Drawing Sheets

DISPLAY APPARATUS

CROSS-REFERENCE TO RELATED APPLICATIONS

This application is based upon and claims the benefit of priority from Japanese Patent Application No. 2008-106060, filed Apr. 15, 2008, the entire contents of which are incorporated herein by reference.

BACKGROUND

1. Field

One embodiment of the invention relates to a display apparatus that contains a read/write device.

2. Description of the Related Art

Some display apparatuses, such as LCD TVs, contain a read/write device, e.g., a hard disc drive, in order to record desired TV programs or play back recorded TV programs.

An information processor that contains a read/write device is disclosed in Jpn. Pat. Appln. KOKAI Publication No. 9-16287. This processor is provided with an insertion guide, a pair of brackets, and a plurality of buffer members. The insertion guide is a box-like structure that is located below a circuit board and in which the read/write device is mounted. The brackets are arranged individually on the opposite sides (left and right) of the insertion guide and fixed to the circuit board by fastening means such as screws. The buffer members are mounted between the insertion guide and the brackets and elastically support the guide.

Many display apparatuses are provided with speakers that output sounds, such as music, voices, etc. When a sound is output from the speakers, vibrations of the speakers are transmitted to the read/write device, thus possibly causing some failure in the read/write device.

In the information processor described in the above patent document, the brackets are expected to be arranged individually on the opposite sides of the insertion guide, so that an operation for assembling a holding mechanism may possibly be complicated.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a display apparatus according to the invention comprises: a housing containing a display panel; a speaker mounted in the housing; a support base contained in the housing, the support base including an upright wall extending along a back surface of the display panel and a support wall projecting horizontally from the upright wall; a read/write device contained in the housing and raised along the upright wall of the support wall; a holder holding the read/write device, the holder including a first holder wall projecting below the read/write device and a second holder wall projecting above the read/write device, the first holder wall being opposed to the support wall of the support base from above; a mounting member including a first portion opposed to the second holder wall of the holder from above and a second portion horizontally opposed to the upright wall of the support base; a first elastic member interposed between the support wall and the first holder wall and supporting the holder in a weight direction of the read/write device; a second elastic member interposed between the first portion of the mounting member and the second holder wall and supporting the holder in the weight direction of the read/write device; and a fastening member fixing the second portion of the mounting member to the upright wall of the support base in a direction perpendicular to the back surface of the display panel. The support wall receives the first elastic member from below in the weight direction of the read/write device. The first elastic member is pressed toward the support wall by a weight of the read/write device.

One embodiment of the present invention will now be described with reference to FIGS. 1 to 11.

Figure 1:
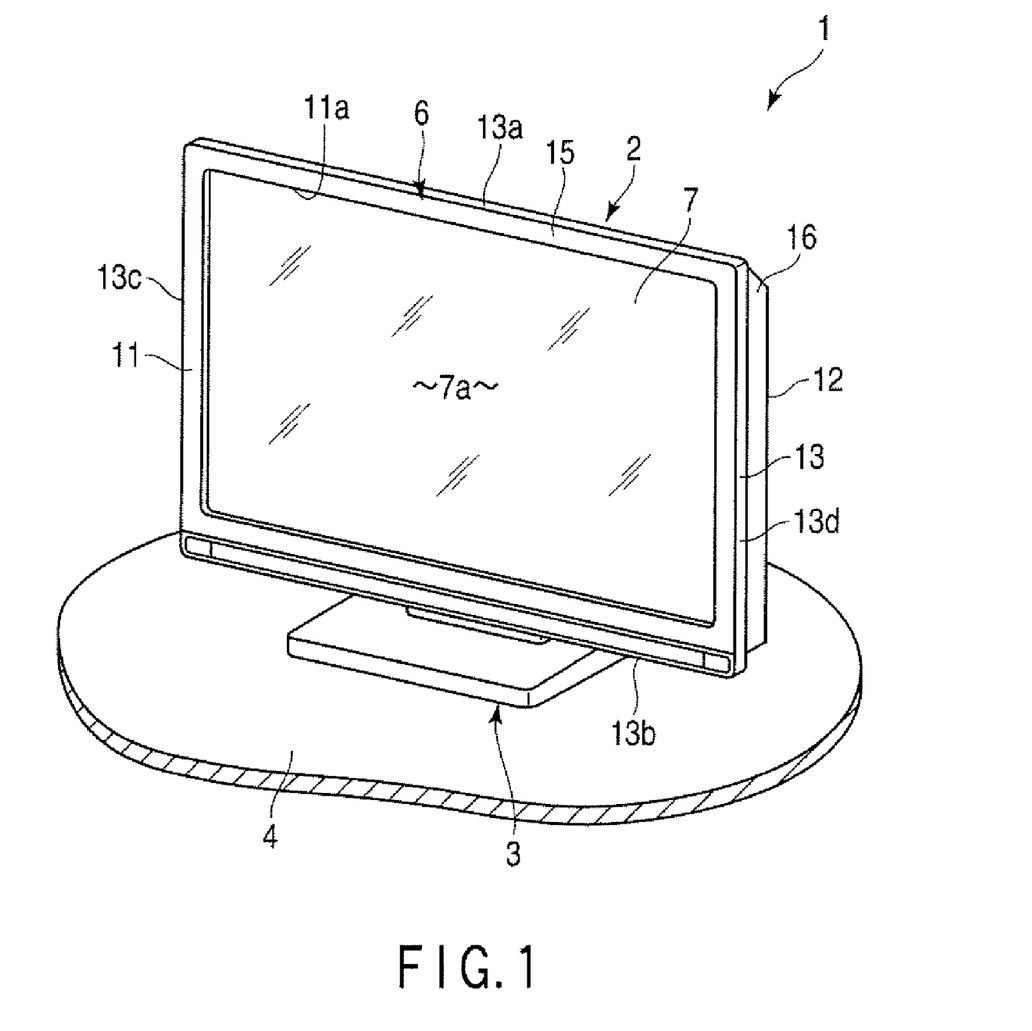
FIG. 1 is an exemplary perspective view of a display apparatus according to one embodiment of the invention.

FIG. 1 shows a flat liquid crystal display (LCD) TV 1 with built-in HDD. The LCD TV 1 is an example of a display apparatus according to the present invention. As shown in FIG. 1, the TV 1 is provided with a display body 2 and a stand 3. The stand 3 is to be placed on, for example, a TV board 4. The display body 2 is formed flat and supported in a raised posture on the stand 3.

The display apparatus according to the present invention is not limited to an LCD TV, and the invention is widely applicable to various other display apparatuses including, for example, a plasma TV, organic electroluminescent (EL) TV, etc. Further, the display apparatus according to the present invention is not limited to the type that is placed on the TV board 4, and may be of a wall-mounted type that can be hung on an indoor wall by means of, for example, metal fittings.

As shown in FIG. 1, the display body 2 is provided with a housing 6 and a display panel 7 contained in the housing 6. The housing 6 is a flat box of, for example, a synthetic resin. The display panel 7 is a flat LCD. The display panel according to the present invention covers a wide variety of concepts including a plasma display and an organic electroluminescent (EL) display.

Figure 4:
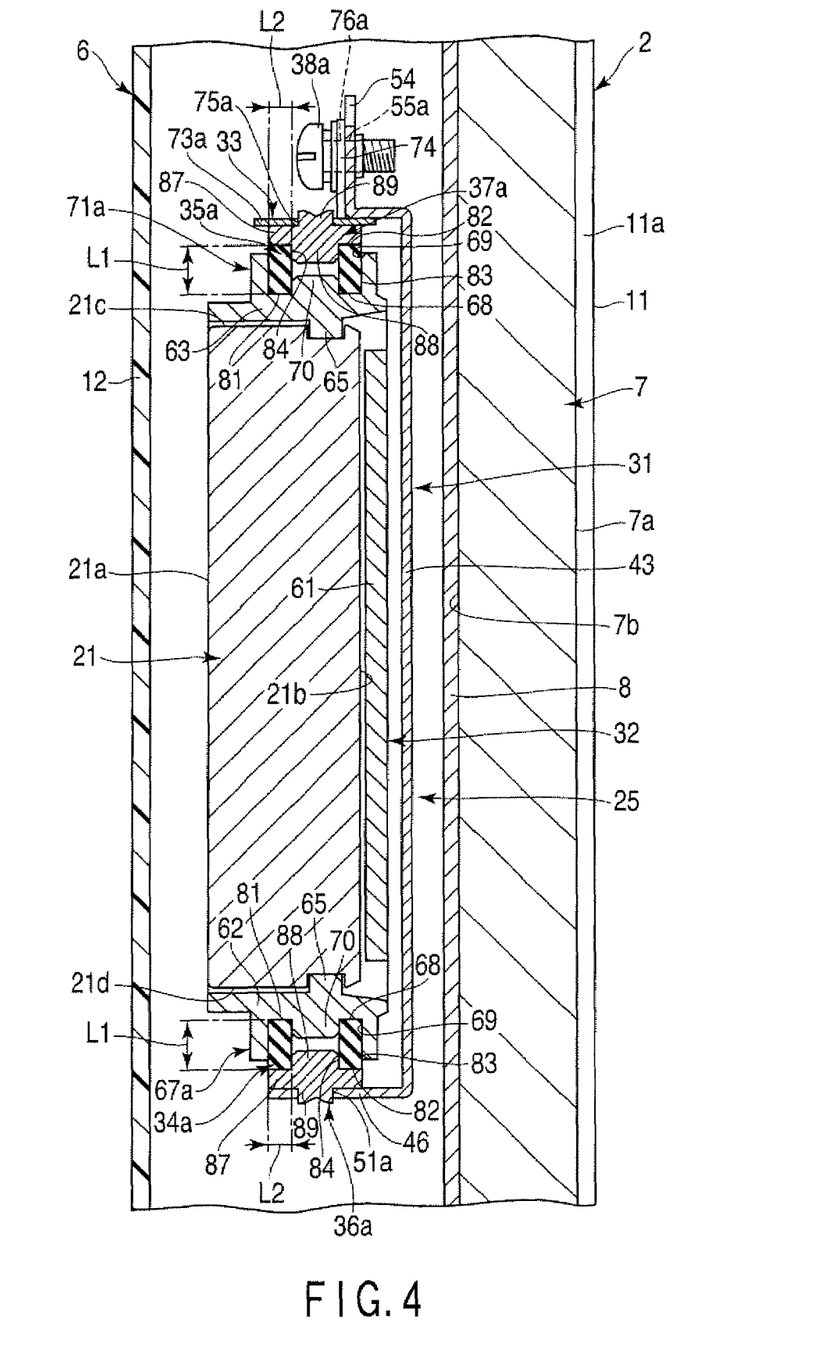
FIG. 4 is an exemplary sectional view of an HDD holding mechanism taken along line F4-F4 of FIG. 3.

The display panel 7 includes a display screen 7a that displays images. As shown in FIG. 4, the display panel 7 includes a back surface 7b that is formed on the side opposite from the display screen 7a. The back surface 7b is opposed to the back side of the LCD TV 1 and rises vertically. A metallic chassis 8 that supports the display panel 7 is mounted on the back surface 7b.

As shown in FIG. 1, the housing 6 includes a front wall 11, a back wall 12, and a peripheral wall 13. The front wall 11 is to be opposed to a user. The front wall 11 is provided with an opening part 11a through which the display screen 7a of the display panel 7 is exposed to the outside of the housing 6. The back wall 12 stands behind the display panel 7 and is opposed to the display panel 7 on the side opposite from the front wall 11. Thus, the back wall 12 is opposed to the back surface 7b of the display panel 7. The peripheral wall 13 connects the respective peripheral edges of the front and back walls 11 and 12. The peripheral wall 13 includes a top wall 13a, a bottom wall 13b, and a pair of sidewalls 13c and 13d, left and right.

As shown in FIG. 1, the housing 6 is provided with a front cover 15 and a back cover 16. The front cover 15 includes the front wall 11 and a part of the peripheral wall 13 and surrounds the display panel 7. The back cover 16 is a box that includes the back wall 12 and a part of the peripheral wall 13 and opens forwardly of the housing 6. The back cover 16 is removably combined with the front cover 15 and covers the display panel 7 from behind.

Figure 3:
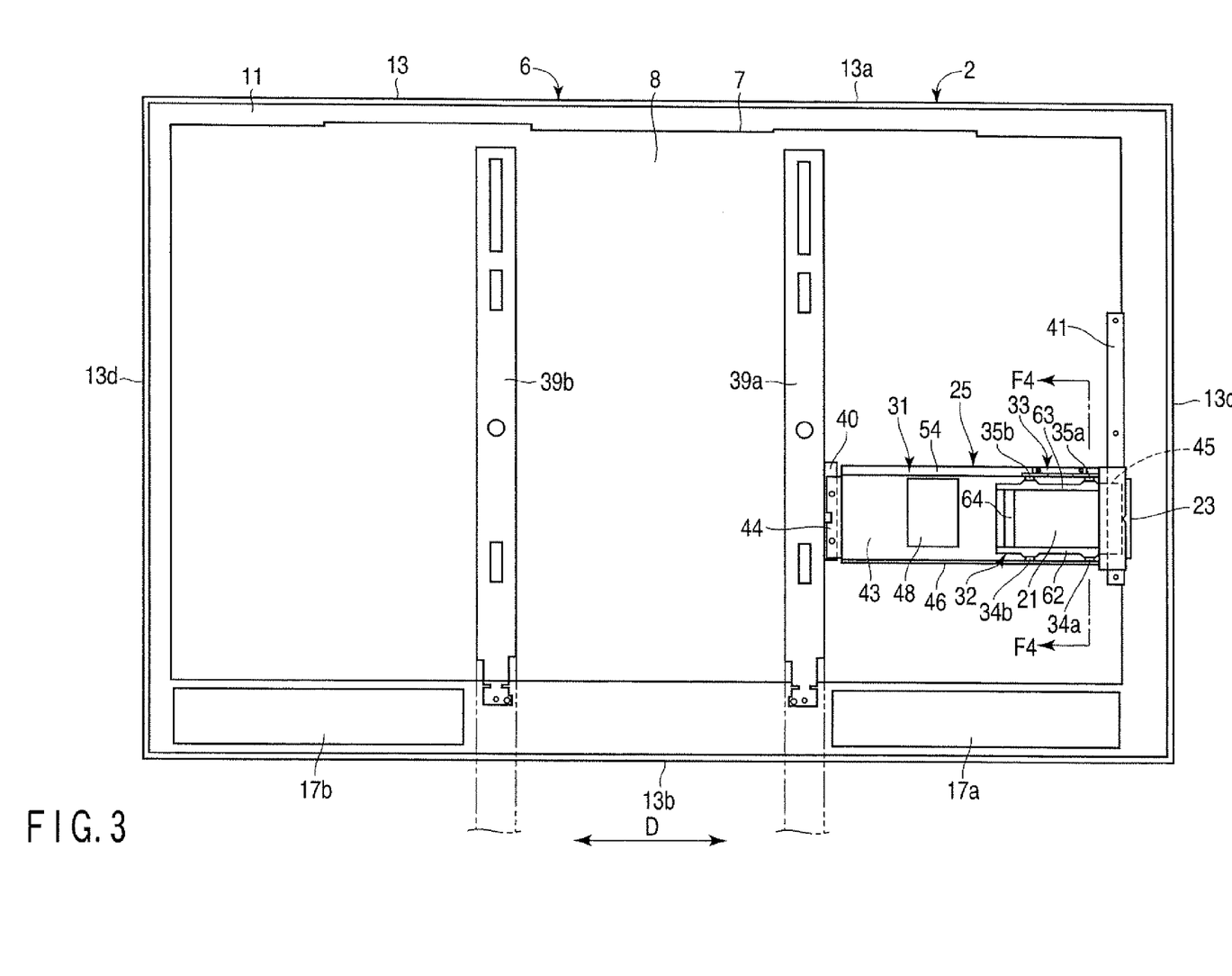
FIG. 3 is an exemplary rear view showing the interior of the display body shown in FIG. 2.

FIG. 3 is an exemplary rear view showing the interior of the housing 6. As shown in FIG. 3, a pair of speakers 17a and 17b that output sounds, such as music, voices, etc., are mounted in the housing 6. The speakers 17a and 17b are spaced apart from each other in a width direction D (left-right direction) of the LCD TV 1 and mounted, for example, under the display panel 7. The number and mounting positions of speakers is not limited to the present embodiment.

Figure 2:
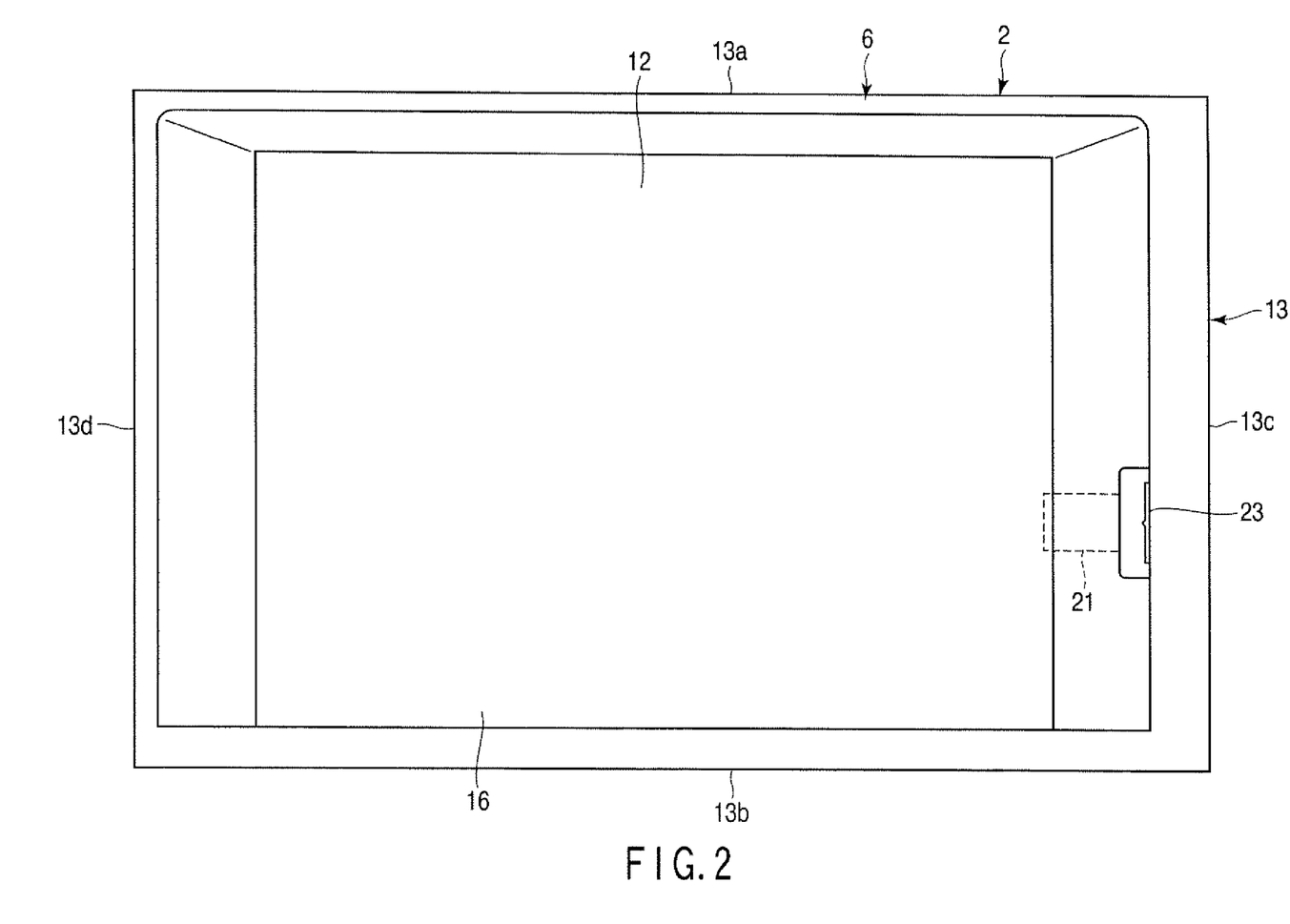
FIG. 2 is an exemplary rear view of a display body shown in FIG. 1.
Figure 6:
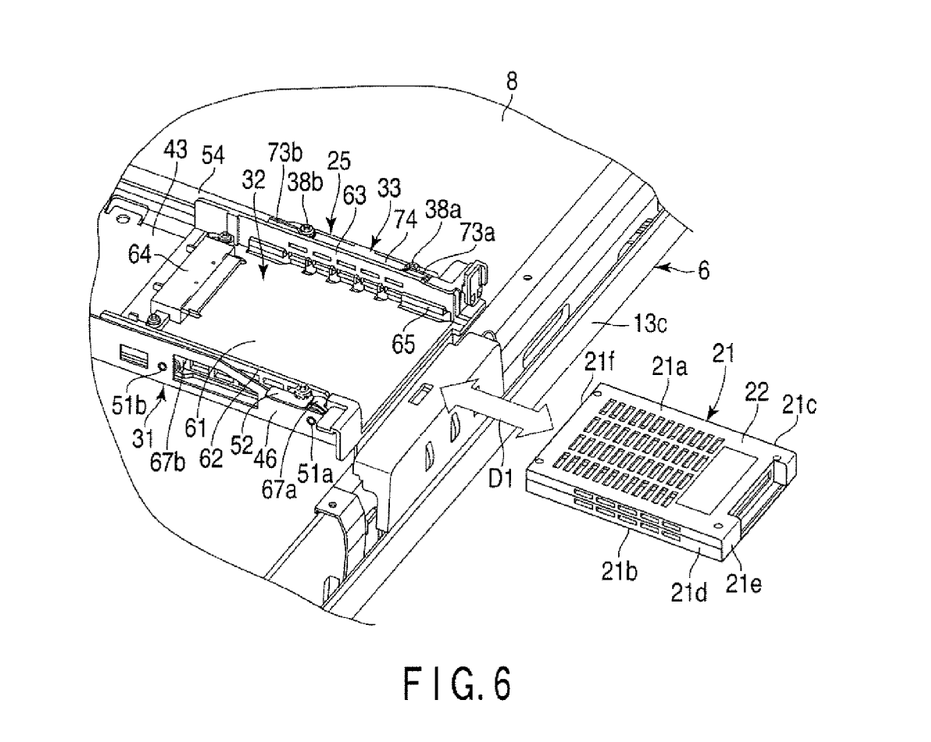
FIG. 6 is an exemplary perspective view showing a state in which the HDD is removed from the HDD holding mechanism shown in FIG. 5.

In the LCD TV 1, as shown in FIGS. 2 and 3, a hard disc drive (HDD) 21 is contained in the housing 6. The HDD 21 is an example of a read/write device according to the present invention, which is used to, for example, record desired TV programs or retrieve and play back recorded TV programs. As shown in FIG. 6, the HDD 21 includes a case 22 of, for example, a synthetic resin and a HDD body (not shown) mounted in the case 22. The HDD body includes, for example, a magnetic disk, carriage, spindle motor, etc.

The HDD 21 according to the present embodiment can be attached to and detached from the display body 2 for replacement by the user. As shown in FIG. 2, a loading slot 23 through which the HDD 21 is mounted and removed is provided in a corner portion of the peripheral wall 13 of the housing 6. The HDD 21 (read/write device) according to the present invention may be of a fixed type such that arbitrary attachment or detachment is not allowed.

As shown in FIG. 6, the HDD 21 is in the form of a flat box, which includes first and second principal surfaces 21a and 21b having relatively large areas and side surfaces 21c, 21d, 21e and 21f that are smaller than the principal surfaces 21a and 21b. The first and second principal surfaces 21a and 21b spread parallel to the magnetic disk of the HDD 21. As shown in FIG. 4, the HDD 21 contained in the housing 6 is in a posture such that it rises along the back surface 7b of the display panel 7, that is, in a posture such that the first and second principal surfaces 21a and 21b rise vertically.

Figure 7:
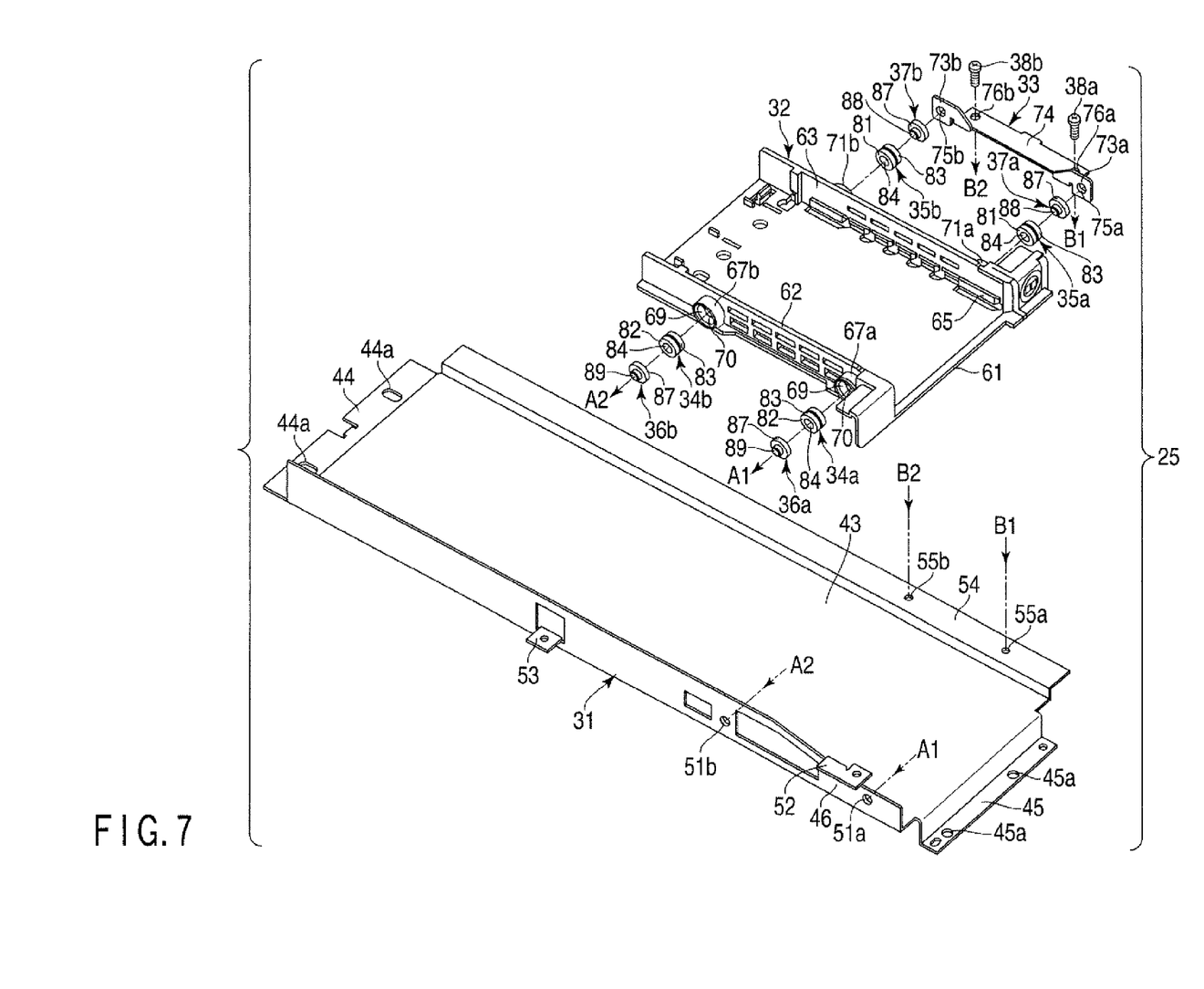
FIG. 7 is an exemplary exploded perspective view of the HDD holding mechanism shown in FIG. 5.

As shown in FIGS. 3 and 7, the LCD TV 1 is provided with a holding mechanism 25 for holding the HDD 21. The holding mechanism 25 includes a support base 31, holder (HDD holder) 32, mounting member 33, first and second elastic members 34a, 34b, 35a and 35b, first and second support members 36a, 36b, 37a and 37b, and fastening members 38a and 38b.

As shown in FIG. 3, a pair of frames 39a and 39b that support the display panel 7 are provided behind the panel 7. The frames 39a and 39b are spaced apart from each other in the width direction D of the LCD TV 1 and individually extend vertically. The frames 39a and 39b are fixed to the stand 3 by extended portions indicated by two-dot chain lines, and the chassis 8 that is attached to the display panel 7 is fixed to the frames 39a and 39b. Thus, the frames 39a and 39b support the display panel 7.

The one frame 39a is provided with a mounting portion 40 to which the support base 31 is fixed. In the longitudinal middle part of the frame 39a, the mounting portion 40 projects flat from the peripheral surface of the frame 39a and extends vertically. At the left-hand end portion of the housing 6, on the other hand, a fixture 41 of, for example, a metal is fixed to the housing 6 (or the chassis 8).

As shown in FIG. 3, the support base 31 is contained in the housing 6. At the back of the display panel 7, the support base 31 extends horizontally between the mounting portion 40 of the frame 39a and the fixture 41. The support base 31 is, for example, a sheet metal member. As shown in FIG. 7, the support base 31 includes an upright wall 43, first and second end portions 44 and 45, and a support wall 46.

The upright wall 43 constitutes a large part of the support base 31, for example, and extends between the mounting portion 40 of the frame 39a and the fixture 41. As shown in FIG. 4, the upright wall 43 is formed to be plate-like, rises vertically, and extends along the back surface 7b of the display panel 7. The upright wall 43 extends vertically so as to cover regions above and below the holder 32. As shown in FIG. 3, a circuit board 48 for controlling, for example, the HDD 21 is mounted on the upright wall 43.

As shown in FIGS. 3 and 7, the first end portion 44 is provided on one longitudinal (or horizontal) end portion of the upright wail 43 and opposed to the mounting portion 40 of the frame 39a. The first end portion 44 includes, for example, a screw insertion hole part 44a and is screwed to the mounting portion 40 of the frame 39a.

The second end portion 45 is provided on the other longitudinal (or horizontal) end portion of the upright wall 43 and opposed to the fixture 41. The second end portion 45 includes, for example, a screw insertion hole part 45a and is screwed to the fixture 41. Thus, the support base 31 is fixed with respect to the housing 6.

As shown in FIGS. 4 and 7, the support wall 46 projects horizontally from, for example, a lower part (more specifically, the lower end portion) of the upright wall 43 toward the back of the LCD TV 1 and extends longitudinally relative to the support base 31. The support wall 46 projects below the holder 32 and supports the holder 32 from below. The support wall 46 is formed integrally with upright wall 43 by bending, for example, one sheet metal member.

As shown in FIG. 7, the support wall 46 is provided with a pair of first hole parts 51a and 51b. The first hole parts 51a and 51b, of which only the one first hole part 51a is illustrated in FIG. 4, open vertically. As shown in FIG. 7, the first hole parts 51a and 51b are examples of a first mounting portion to which the first support member is fitted, individually, and are fitted with the first support members 36a and 36b (described in detail later), respectively. Also, the first hole parts 51a and 51b are examples of a first position regulating portion according to the present invention, individually. The first hole parts 51a and 51b regulate the horizontal positions of the first elastic members 34a and 34b through the first support members 36a and 36b that are fitted to the first hole parts 51a and 51b, for example.

The first hole parts 51a and 51b are, for example, through-hole parts that penetrate the support wall 46. They are not limited to through-hole parts but may alternatively be bottomed hole parts. The pair of first hole parts 51a and 51b are spaced apart from each other in the width direction D of the LCD TV 1. Further, the support wall 46 is provided with, for example, a fixing portion 52, to which the back cover 16 is screwed, another fixing portion 53, etc.

As shown in FIGS. 4 and 7, the upright wall 43 includes an upright fixing portion 54. The upright fixing portion 54 is located on, for example, an upper part (more specifically, the upper end portion) of the upright wall 43 and extends longitudinally relative to the support base 31. The upright fixing portion 54 includes a stepped portion at, for example, the central portion of the upright wall 43 and extends rising vertically. The upright fixing portion 54 is situated, for example, above the holder 32.

As shown in FIG. 7, the upright wall 43 is provided with a pair of tapped hole parts 55a and 55b. The tapped hole parts 55a and 55b, of which only the one tapped hole part 55a is illustrated in FIG. 4, open horizontally. As shown in FIG. 7, the tapped hole parts 55a and 55b are, for example, through-hole parts that penetrate the upright wall 43 and are formed individually with internal threads. The tapped hole parts 55a and 55b are not limited to through-hole parts but may alternatively be bottomed hole parts. The pair of tapped hole parts 55a and 55b are spaced apart from each other in the width direction D of the LCD TV 1.

As shown in FIGS. 4 to 7, the holder 32 is formed of, for example, a synthetic resin and is provided with a holder body 61, a first holder wall 62, and a second holder wall 63. The holder body 61 is formed corresponding in width to the HDD 21 and is opposed to the second principal surface 21b of the HDD 21. As shown in FIG. 4, the holder body 61 rises vertically along the upright wall 43 of the support base 31. A gap is defined between the holder body 61 and the support base 31.

As shown in FIG. 6, a relay connector 64 is mounted on the holder body 61. The connector 64 is electrically connected to the circuit board 48 by a cable (not shown). The HDD 21 that is attached to the holder 32 is connected to the connector 64.

As shown in FIG. 4, the first holder wall 62 is provided on the lower end portion of the holder body 61 and projects below the HDD 21. The second holder wall 63 is provided on the upper end portion of the holder body 61 and projects above the HDD 21. As shown in FIGS. 3 and 7, the first and second holder walls 62 and 63 extend in the width direction D of the LCD TV 1.

Figure 5:
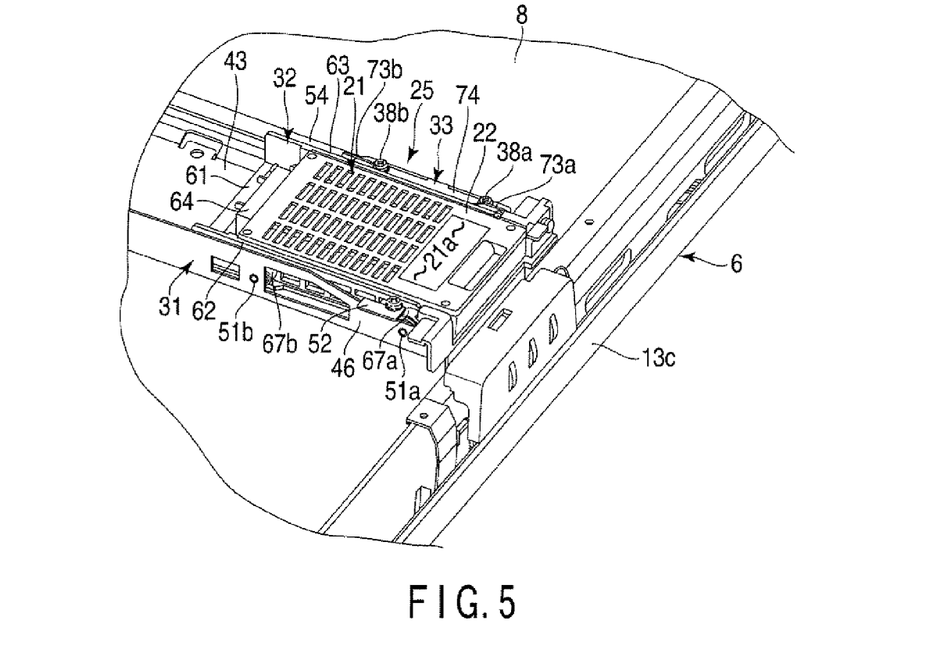
FIG. 5 is an exemplary perspective view showing a state in which an HDD is mounted in the HDD holding mechanism shown in FIG. 3.

In the holder 32, as shown in FIG. 5, the HDD 21 is interposed and held between the first and second holder walls 62 and 63. The HDD 21 is removably loaded in the direction of arrow D1 of FIG. 6 into the holder 32. As shown in FIGS. 4 and 6, the first and second holder walls 62 and 63 each include a guide portion 65 that guides the HDD 21 to the inner part of the holder 32 through the loading slot 23.

As shown in FIG. 4, the holder 32 is located above the support wall 46 of the support base 31. Specifically, the holder 32 is located so that the first holder wall 62 is opposed to the support wall 46 from above and that the holder body 61 extends along the upright wall 43. The holder 32 is set on the support wall 46 of the support base 31 by means of the first elastic members 34a and 34b and the first support members 36a and 36b, which will be mentioned later.

As shown in FIG. 7, the first holder wall 62 is provided with a pair of first recessed parts 67a and 67b. The first recessed parts 67a and 67b, of which only the one first recessed part 67a is illustrated in FIG. 4, open vertically downward. The first recessed parts 67a and 67b are examples of a third position regulating portion according to the present invention, individually, and regulate the horizontal positions of the first elastic members 34a and 34b.

Figure 9:
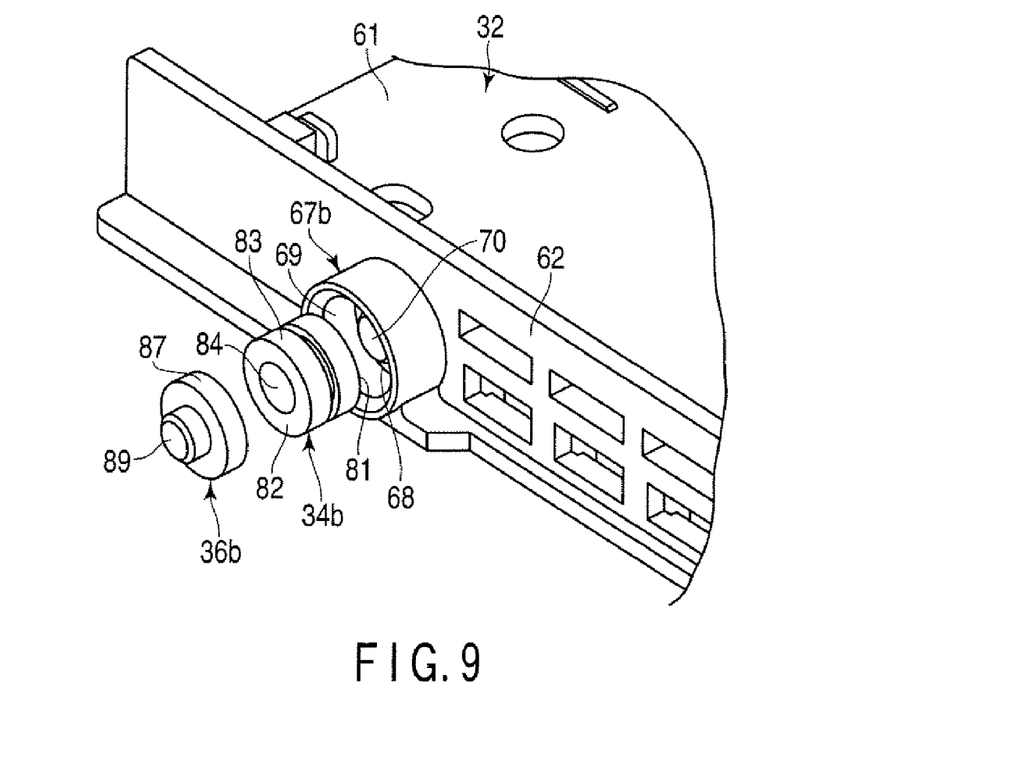
FIG. 9 is an exemplary exploded perspective view showing a first recessed part of the HDD holding mechanism shown in FIG. 7 and its surroundings.

As shown in FIGS. 7 and 9, each of the first recessed parts 67a and 67b projects in the form of a cylinder (e.g., circular cylinder) from the first holder wall 62 and includes a bottom portion 68 and an inner peripheral surface 69 that extends from the peripheral edge of the bottom portion 68. As shown in FIG. 4, the bottom portion 68 is vertically opposed to the support wall 46 of the support base 31. A downwardly projecting portion 70 is provided on the central part of the bottom portion 68.

As shown in FIG. 7, the pair of first recessed parts 67a and 67b are spaced apart from each other in the width direction D of the LCD TV 1 and opposed to the pair of first hole parts 51a and 51b, respectively, in the support wall 46. The first recessed parts 67a and 67b are coaxial with the first hole parts 51a and 51b, respectively.

Figure 10:
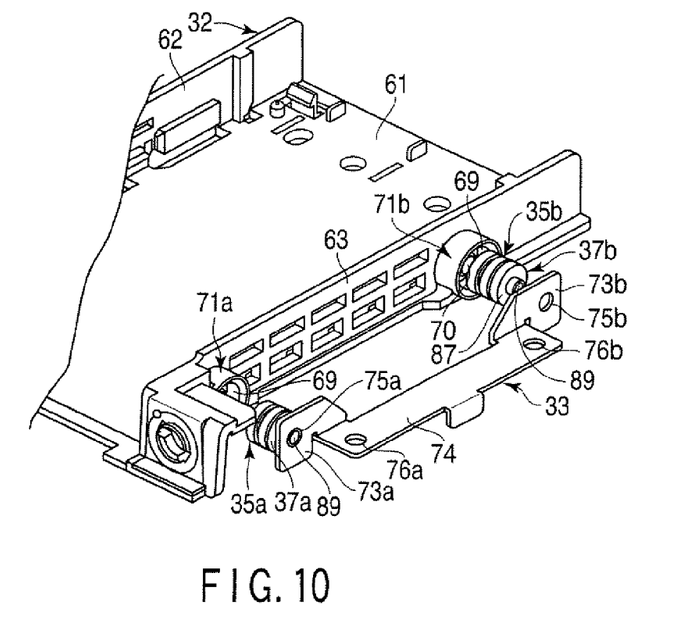
FIG. 10 is an exemplary exploded perspective view showing second recessed parts of the HDD holding mechanism shown in FIG. 7 and their surroundings.
Figure 11:
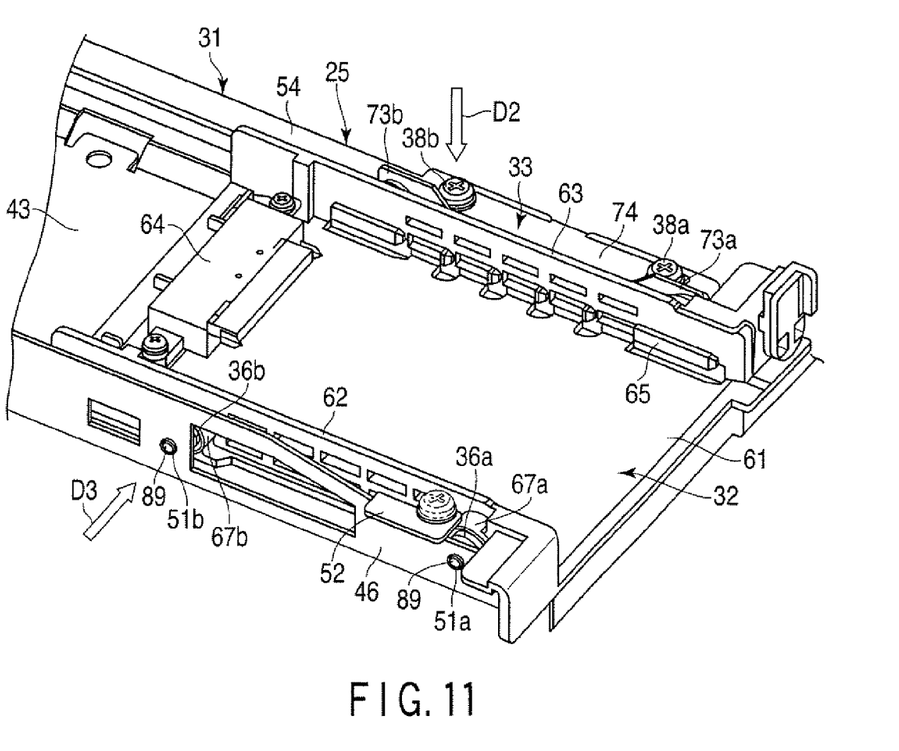
FIG. 11 is an exemplary perspective view showing a direction in which fastening members shown in FIG. 7 are fixed.

As shown in FIG. 10, the second holder wall 63 is provided with a pair of second recessed parts 71a and 71b. The second recessed parts 71a and 71b, of which only the one second recessed part 71a is illustrated in FIG. 4, open vertically upward. The second recessed parts 71a and 71b are examples of a fourth position regulating portion according to the present invention, individually, and regulate the horizontal positions of the second elastic members 35a and 35b.

As shown in FIG. 10, each of the second recessed parts 71a and 71b projects in the form of a cylinder (e.g., circular cylinder) from the second holder wall 63 and, like the first recessed parts 67a and 67b, includes a bottom portion 68 and an inner peripheral surface 69 that extends from the peripheral edge of the bottom portion 68. As shown in FIG. 4, an upwardly projecting portion 70 is provided on the central part of the bottom portion 68. The bottom portion 68 is vertically opposed to the mounting member 33. As shown in FIG. 10, the pair of second recessed parts 71a and 71b are spaced apart from each other in the width direction D of the LCD TV 1.

As shown in FIG. 7, the mounting member 33 is, for example, a so-called mounting metal fitting. The mounting member 33 includes, for example, a pair of first portions 73a and 73b and a second portion 74 that rises from the first portions 73a and 73b.

As shown in FIGS. 4 and 7, the first portions 73a and 73b project horizontally toward the back of the LCD TV 1 and are opposed to the second holder wall 63 from above. The pair of first portions 73a and 73b are spaced apart from each other in the width direction D of the LCD TV 1 and opposed to the pair of second recessed parts 71a and 71b, respectively, in the second holder wall 63.

As shown in FIG. 7, the first portions 73a and 73b are provided with a pair of second hole parts 75a and 75b, respectively. The second hole parts 75a and 75b, of which only the one second hole part 75a is illustrated in FIG. 4, open vertically. The second hole parts 75a and 75b are examples of a second mounting portion to which the second support member is fitted, individually, and are fitted with the second support members 37a and 37b (described in detail later), respectively. Also, the second hole parts 75a and 75b are examples of a second position regulating portion according to the present invention, individually. The second hole parts 75a and 75b regulate the horizontal positions of the second elastic members 35a and 35b through the second support members 37a and 37b that are fitted to the second hole parts 75a and 75b, for example.

The second hole parts 75a and 75b are, for example, through-hole parts that penetrate the first portions 73a and 73b. They are not limited to through-hole parts but may alternatively be bottomed hole parts. The pair of second hole parts 75a and 75b are spaced apart from each other in the width direction D of the LCD TV 1 and opposed to the second recessed parts 71a and 71b, respectively, in the second holder wall 63. The second recessed parts 71a and 71b are coaxial with the second hole parts 75a and 75b, respectively.

As shown in FIG. 7, the second portion 74 of the mounting member 33 extends horizontally between the pair of first portions 73a and 73b so as to connect the first portions 73a and 73b to each other. As shown in FIG. 4, the second portion 74 rises vertically and is horizontally opposed to the upright fixing portion 54 of the upright wall 43.

As shown in FIG. 7, the second portion 74 is provided with a pair of screw insertion hole parts 76a and 76b. The screw insertion hole parts 76a and 76b, of which only the one screw insertion hole part 76a is illustrated in FIG. 4, open horizontally. As shown in FIG. 7, the pair of screw insertion hole parts 76a and 76b are spaced apart from each other in the width direction D of the LCD TV 1 and opposed to the pair of tapped hole parts 55a and 55b, respectively, in the upright fixing portion 54 of the support base 31. The screw insertion hole parts 76a and 76b are coaxial with the tapped hole parts 55a and 55b, respectively.

As shown in FIGS. 4 to 7, the first elastic members 34a and 34b are interposed between the support wall 46 and the first holder wall 62 and support the holder 32 from below in the weight direction of the HDD 21 (or the vertical direction). The first elastic members 34a and 34b are anti-vibration dampers of, for example, a material having ultra-low hardness.

Figure 8:
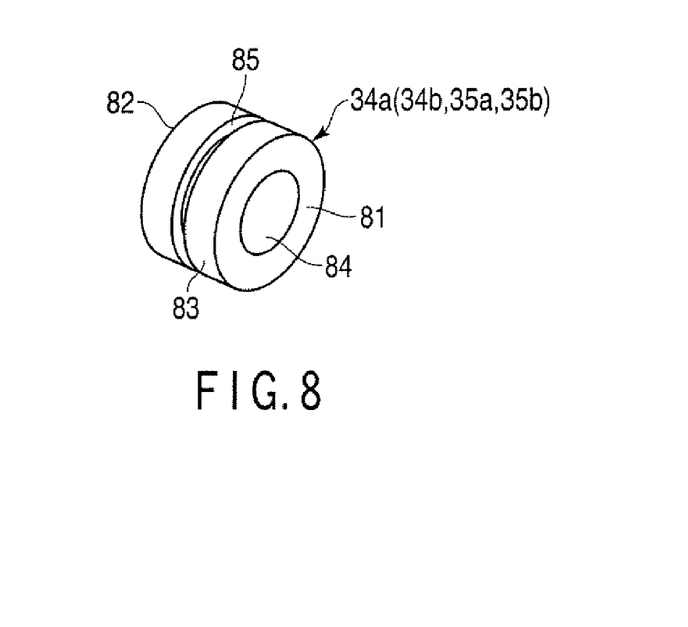
FIG. 8 is an exemplary perspective view of a first elastic member shown in FIG. 7.

FIG. 8 shows the first elastic member 34a or 34b. Each of the first elastic members 34a and 34b is in the form of, for example, a cylinder (e.g., circular cylinder) and includes a pair of flat end faces 81 and 82 and an outer peripheral surface 83 that connects the respective peripheral edges of the end faces 81 and 82. The pair of end faces 81 and 82 are provided with a vertically-opening hole part 84 in their central part. The hole part 84 is, for example, a through-hole part that penetrates the first elastic members 34a and 34b. The hole part 84 is not limited to a through-hole part but may alternatively be a bottomed hole part. Although the first elastic member 34a (34b) shown in FIG. 8 is provided with a circumferential groove 85, moreover, this groove is not an essential component element but may be omitted as required.

As shown in FIGS. 7 and 9, the distal end portions of the first elastic members 34a and 34b are inserted into the first recessed parts 67a and 67b, respectively, in the first holder wall 62. Thus, the end faces 81 of the first elastic members 34a and 34b contact the bottom portions 68 of the first recessed parts 67a and 67b, respectively. The outer peripheral surfaces 83 of the first elastic members 34a and 34b contact the inner peripheral surfaces 69 of the first recessed parts 67a and 67b, respectively. Thus, the first elastic members 34a and 34b elastically support the holder 32 in the vertical direction and 360-degree horizontal directions.

The first support members 36a and 36b are, for example, columnar members having the same outside diameter as the first elastic members 34a and 34b. Each of the first support members 36a and 36b includes a body portion 87, a first projecting portion 88 that projects in one direction (e.g., upward) from the body portion 87, and a second projecting portion 89 that projects in the other direction (e.g., downward) from the body portion 87. The first and second projecting portions 88 and 89 are coaxial with each other.

As shown in FIGS. 4 to 7, the first projecting portions 88 of the first support members 36a and 36b are inserted into the hole parts 84 of the first elastic members 34a and 34b, respectively. The second projecting portions 89 of the first support members 36a and 36b are inserted into the first hole parts 51a and 51b, respectively, of the support wall 46. Thus, the first elastic members 34a and 34b are supported and regulated in horizontal position by the first support members 36a and 36b, respectively.

As shown in FIGS. 4 and 10, the second elastic members 35a and 35b are interposed between the second holder wall 63 and the first portions 73a and 73b of the mounting member 33 and support the holder 32 from above in the weight direction of the HDD 21 (or the vertical direction). The second elastic members 35a and 35b are anti-vibration dampers of, for example, a material having ultra-low hardness.

The second elastic members 35a and 35b are constructed in the same manner as the first elastic members 34a and 34b shown in FIG. 8. Specifically, each of the second elastic members 35a and 35b is in the form of, for example, a cylinder (e.g., circular cylinder) and includes a pair of flat end faces 81 and 82 and an outer peripheral surface 83 that connects the respective peripheral edges of the end faces 81 and 82. The end faces 81 and 82 are provided with a vertically-opening hole part 84 in their central part. The hole part 84 is, for example, a through-hole part that penetrates the second elastic members 35a and 35b.

As shown in FIG. 10, the distal end portions of the second elastic members 35a and 35b are inserted into the second recessed parts 71a and 71b, respectively, in the second holder wall 63. Thus, the end faces 81 of the second elastic members 35a and 35b contact the bottom portions 68 of the second recessed parts 71a and 71b, respectively. The outer peripheral surfaces 83 of the second elastic members 35a and 35b contact the inner peripheral surfaces 69 of the second recessed parts 71a and 71b, respectively. Thus, the second elastic members 35a and 35b elastically support the holder 32 in the vertical direction and the 360-degree horizontal directions.

The second support members 37a and 37b are, for example, columnar members having the same outside diameter as the second elastic members 35a and 35b. Each of the second support members 37a and 37b includes a body portion 87, a first projecting portion 88 that projects in one direction (e.g., downward) from the body portion 87, and a second projecting portion 89 that projects in the other direction (e.g., upward) from the body portion 87. The first and second projecting portions 88 and 89 are coaxial with each other.

As shown in FIGS. 4 to 7, the first projecting portions 88 of the second support members 37a and 37b are inserted into the hole parts 84 of the second elastic members 35a and 35b, respectively. The second projecting portions 89 of the second support members 37a and 37b are inserted into the second hole parts 75a and 75b, respectively, of the mounting member 33. Thus, the second elastic members 35a and 35b are supported and regulated in horizontal position by the second support members 37a and 37b, respectively.

The pair of fastening members 38a and 38b are, for example, screws, individually. They fix the second portion 74 of the mounting member 33 to the upright fixing portion 54 of the upright wall 43 in the direction perpendicular to the back surface 7b of the display panel 7. More specifically, the fastening members 38a and 38b are passed through the screw insertion hole parts 76a and 76b, respectively, of the second portion 74 and screwed into the tapped hole parts 55a and 55b, respectively, of the upright fixing portion 54. Thus, the mounting member 33 is fixed to the support base 31.

The following is a description of a method of assembly and the operation of the holding mechanism 25.

The holding mechanism 25 is assembled with the display body 2 laid flat, that is, with the back surface 7b of the display panel 7 upward. First, the first and second end portions 44 and 45 of the support base 31 are fixed to the mounting portions 40 of the frame 39a and the fixture 41, respectively, whereby the support base 31 is fixed with respect to the housing 6.

Then, the holder 32 is attached to the support base 31. When this is done, the display body 2 is also laid flat, so that the upright wall 43 lies horizontally. The first elastic members 34a and 34b are fitted to the first recessed parts 67a and 67b, respectively, of the holder 32, and the first projecting portions 88 of the first support members 36a and 36b are inserted into the hole parts 84 of the first elastic members 34a and 34b, respectively. With the first elastic members 34a and 34b and the first support members 36a and 36b located along the holder 32, moreover, the holder 32 is set on the upright wall 43, and the second projecting portions 89 of the first support members 36a and 36b are aligned with the first hole parts 51a and 51b, respectively, of the support wall 46.

Subsequently, the mounting member 33 is attached to the holder 32. The second elastic members 35a and 35b are fitted to the second recessed parts 71a and 71b, respectively, of the holder 32, and the first projecting portions 88 of the second support members 37a and 37b are inserted into the hole parts 84 of the second elastic members 35a and 35b, respectively. With the second elastic members 35a and 35b and the second support members 37a and 37b located along the holder 32, moreover, the second hole parts 75a and 75b of the mounting member 33 are aligned with the second projecting portions 89 of the second support members 37a and 37b, respectively.

Then, the mounting member 33 is fixed to the support base 31. When this is done, the display body 2 is also laid flat, so that the second portion 74 of the mounting member 33 lies horizontally. Specifically, the fastening members 38a and 38b are passed through the screw insertion hole parts 76a and 76b, respectively, of the mounting member 33 in the vertical direction (i.e., a direction of arrow D2 in FIG. 11 perpendicular to the back surface 7b of the display panel 7) and directly vertically screwed into the tapped hole parts 55a and 55b, respectively, of the support base 31. Thus, the mounting member 33 is fixed to the support base 31. Thereupon, the assembly of the holding mechanism 25 is completed. After the holding mechanism 25 is assembled, the HDD 21 is loaded into the holder 32, and attaching the back cover 16 or the like are performed.

If the display body 2 is raised into a normal posture, the first elastic members 34a and 34b are situated below the HDD 21, so that the weight of the HDD 21 acts on the first elastic members 34a and 34b. The support wall 46 of the support base 31 receives the first elastic members 34a and 34b from below in the weight direction of the HDD 21. Thus, the first elastic members 34a and 34h are sandwiched between the support wall 46 and the HDD 21 and pressed toward the support wall 46 by the weight of the HDD 21. In consequence, the first elastic members 34a and 34b are held in position between the support wall 46 (more accurately, the first support members 36a and 36b) and the holder 32.

According to the LCD TV 1 constructed in this manner, vibrations transmitted from, for example, the speakers 17a and 17b to the HDD 21 can be reduced, and high assemblability can be achieved. Specifically, the holder 32 is elastically supported on the support base 31 by the first and second elastic members 34a, 34b, 35a and 35b. Thus, even if vibrations (e.g., low-frequency vibrations) from the speakers 17a and 17b are transmitted to the support base 31, they are damped by the first and second elastic members 34a, 34b, 35a and 35b, whereby the vibrations transmitted to the HDD 21 are reduced.

As shown in FIG. 4, the first and second elastic members 34a, 34b, 35a and 35b vertically support the holder 32 by means of their respective end faces 81 and horizontally support the holder 32 by means of their outer peripheral surfaces 83. A distance L1 between the first and second end faces 81 and 82 is longer than a distance L2 between the outer peripheral surface 83 and the inner peripheral surface of the hole part 84. Accordingly, the first and second elastic members 34a, 34b, 35a and 35b are higher in vertical damping property than in horizontal damping property.

According to the present embodiment, the first and second elastic members 34a, 34b, 35a and 35b enhance the damping property for the direction in which the weight of the HDD 21 acts as a load by aligning the direction for the higher damping property with the weight direction of the HDD 21.

When the first elastic members 34a and 34b are subjected to the weight of the HDD 21, they are pressed toward the support wall 46. Thus, the first elastic members 34a and 34b are regulated in position between the support wall 46 and the holder 32, so that they cannot be easily disengaged from the holder 32. In consequence, the holder 32 can be held with stability by only setting the one mounting member 33 against one side of it without separately providing another mounting member under the holder 32. Thus, the number of mounting members 33 needed to support the holder 32 can be reduced, so that high assemblability (or workability) can be achieved.

If the mounting member 33 is provided with the first portions 73a and 73b and the second portion 74, moreover, the fastening members 38a and 38b can be mounted in a direction (direction of arrow D2 in FIG. 11) perpendicular to the back surface 7b of the display panel 7, not in a direction (direction of arrow D3 in FIG. 11) in which the first elastic members 34a and 34b are supported. As a result, the fastening direction of the fastening members 38a and 38b can be aligned with the mounting direction of another member (e.g., display panel 7) during a line operation, so that the assemblability of the LCD TV 1 is further improved.

The support wall 46 includes the first position regulating portion for regulating the horizontal positions of the first elastic members 34a and 34b. The first portions 73a and 73b of the mounting member 33 include the second position regulating portion for regulating the horizontal positions of the second elastic members 35a and 35b. Thus, the first and second elastic members 34a, 34b, 35a and 35b are regulated in horizontal deviation, so that their respective positions are stabilized in the holding mechanism 25 that has the one-sided setting.

If the holding mechanism 25 is provided with the first and second support members 36a, 36b, 37a and 37b, the first and second elastic members 34a, 34b, 35a and 35b can be regulated in horizontal position by means of a relatively simple construction. In particular, the first and second position regulating portions include the first hole parts 51a and 51b and the second hole parts 75a and 75b, respectively, which open vertically, and the first and second support members 36a, 36b, 37a and 37b include the second projecting portions 89 that are inserted individually into the hole parts 51a, 51b, 75a and 75b. Thereupon, the first and second elastic members 34a, 34b, 35a and 35b can be regulated in horizontal position by means of the very simple construction that includes the hole parts and the projecting portions.

The first holder wall 62 of the holder 32 includes the third position regulating portion for regulating the horizontal positions of the first elastic members 34a and 34b, while the second holder wall 63 of the holder 32 includes the fourth position regulating portion for regulating the horizontal positions of the second elastic members 35a and 35b. Thus, the first and second elastic members 34a, 34b, 35a and 35b are regulated in horizontal deviation, so that their respective positions are further stabilized in the holding mechanism 25 that has the one-sided setting.

If the third position regulating portion is the recessed parts 67a and 67b into which the first elastic members 34a and 34b are inserted, respectively, and if the fourth position regulating portion is the recessed parts 71a and 71b into which the second elastic members 35a and 35b are inserted, respectively, the first and second elastic members 34a, 34b, 35a and 35b can be regulated in horizontal position by means of a relatively simple construction.

The first and second elastic members 34a, 34b, 35a and 35b individually include the hole parts 84 that open vertically, and the first and second support members 36a, 36b, 37a and 37b include the projecting portions 88 that are inserted into the hole parts 84 of the elastic members 34a, 34b, 35a and 35b, individually. Thus, the first and second elastic members 34a/34b, 35a and 35b can absorb vibrations in all horizontal directions based on a relatively simple construction.

Although the LCD TV 1 according to the one embodiment of the present invention has been described herein, the invention is not limited to this embodiment. In carrying out this invention, its components may be embodied in modified forms without departing from the scope or spirit of the invention.

In the foregoing embodiment, for example, the support wall 46 and the mounting member 33 are provided with the hole parts 51a, 51b, 75a and 75b for use as the first and second position regulating portions, and the first and second holder walls 62 and 63 with the first and second recessed parts 67a, 67b, 71a and 71b for use as the third and fourth position regulating portions. Alternatively, however, the support wall 46 and the mounting member 33 may be provided with the first and second recessed parts 67a, 67b, 71a and 71b for use as the first and second position regulating portions, and the first and second holder walls 62 and 63 with the hole parts 51a, 51b, 75a and 75b for use as the third and fourth position regulating portions.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display apparatus comprising:
a housing containing a display panel;
a speaker mounted in the housing;
a support base fixed to the housing, the support base including an upright wall extending along a back surface of the display panel and a support wall projecting horizontally from the upright wall;
a read/write device formed in a flat shape, contained in the housing, and raised along the upright wall of the support wall;
a holder holding the read/write device, the holder including a first holder wall projecting below the read/write device and a second holder wall projecting above the read/write device, the first holder wall being opposed to the support wall of the support base from above;
a mounting member including a first portion opposed to the second holder wall of the holder from above and a second portion horizontally opposed to the upright wall of the support base;
a first elastic member held between the support wall and the first holder wall and supporting the holder in a weight direction of the read/write device;
a second elastic member held between the first portion of the mounting member and the second holder wall and supporting the holder in the weight direction of the read/write device; and
a fastening member fixing the second portion of the mounting member to the upright wall of the support base in a direction perpendicular to the back surface of the display panel,
the support wall receiving the first elastic member from below in the weight direction of the read/write device, the first elastic member being pressed toward the support wall by a weight of the read/write device.

2. A display apparatus of claim 1, wherein the support wall includes a first position regulating portion which regulates a horizontal position of the first elastic member, and the first portion of the mounting member includes a second position regulating portion which regulates a horizontal position of the second elastic member.

3. A display apparatus of claim 2, further comprising:
a first support member supporting the first elastic member; and
a second support member supporting the second elastic member, wherein
the first position regulating portion is a first mounting portion to which the first support member is attached, the second position regulating portion is a second mounting portion to which the second support member is attached.

4. A display apparatus of claim 3, wherein the first mounting portion and the second mounting portion each includes a mounting hole part formed in a vertical direction, the first support member includes a projecting portion inserted into the mounting hole part of the first mounting portion, and the second support member includes a projecting portion inserted into the mounting hole part of the second mounting portion.

5. A display apparatus of claim 4, wherein the first holder wall includes a third position regulating portion which regulates a horizontal position of the first elastic member, and the second holder wall includes a fourth position regulating portion which regulates a horizontal position of the second elastic member.

6. A display apparatus of claim 5, wherein the third position regulating portion is a recessed part which is formed in the vertical direction and into which the first elastic member is inserted, and the fourth position regulating portion is a recessed part which is formed in the vertical direction and into which the second elastic member is inserted.

7. A display apparatus of claim 6, wherein the first elastic member and the second elastic member each include a mounting hole part formed in the vertical direction, the first support member includes a projecting portion inserted into the mounting hole part of the first elastic member, and the second support member includes a projecting portion inserted into the mounting hole part of the second elastic member.

* * * * *